May 1, 1923.
W. C. HUNTER
1,453,876
MEASURING DEVICE
Filed April 27, 1922
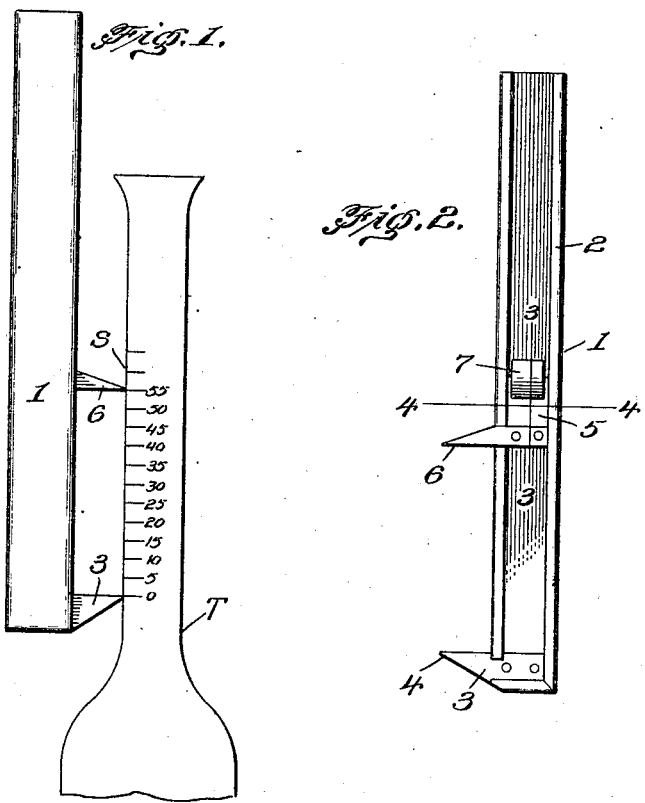
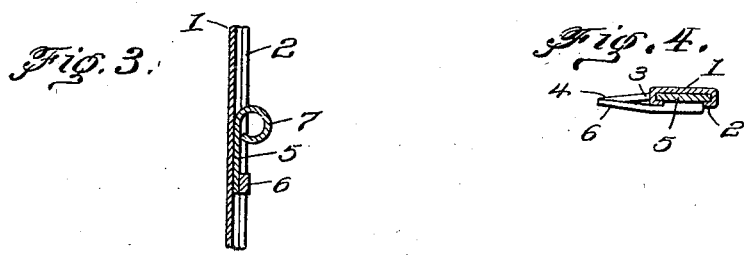
INVENTOR.
BY
ATTORNEY.

Patented May 1, 1923.

1,453,876

UNITED STATES PATENT OFFICE.

WILLIAM C. HUNTER, OF ST. LOUIS, MISSOURI.

MEASURING DEVICE.

Application filed April 27, 1922. Serial No. 556,963.

*To all whom it may concern:*

Be it known that I, WILLIAM C. HUNTER, a citizen of the United States, residing at 5057 Kensington, in the city of St. Louis and State of Missouri, have invented certain new and useful Improvements in Measuring Devices, of which the following is a specification.

This invention relates to devices for reading the amount of butter fat contained in a Babcock or other test tube.

The object of the invention is to provide a simple, quickly operable instrument for accurately measuring the amount of butter fat contained in the milk being tested.

Another object is to provide an instrument of this character which may be manipulated with one hand to permit the user to employ his other hand for other purposes.

With these and other objects in view, the invention consists in certain novel features of construction as hereinafter shown, described and claimed.

In the accompanying drawings:—

Figure 1 represents a side elevation of the upper portion of a test tube with this improved gauge shown in connection therewith.

Fig. 2 is a side elevation of the gauge taken from the side opposite to that shown in Fig. 1.

Fig. 3 is a detail longitudinal section taken on the line 3—3 of Fig. 2, and

Fig. 4 is a detail transverse section taken on the line 4—4 of Fig. 2.

In the embodiment illustrated, a test tube T is shown having a scale S marked thereon in connection with which the instrument constituting this invention is designed to be used.

In taking tests of the butter fats contained in milk the milk to be tested is combined with an agent which will separate the fats from the milk, such as a suitable acid and after being thoroughly mixed the so treated milk is placed in the test tube T and after standing a few minutes the butter fat will rise in said tube. Ordinarily a pair of dividers is used for obtaining the amount indicated on the tube but they are objectionable for the reason that they are difficult to retain in set position being liable to change after the reading has been taken and moreover they require the use of both hands to manipulate them.

The gauge or instrument constituting this invention comprises a sheet metal strip 1 having its longitudinal side edges turned inward and spaced to form suitable guides 2 for a movable measuring finger 5. A fixed gauge element 3 is riveted or otherwise secured to one end of the strip 1 and extends laterally at right angles therefrom having its outer edge bevelled to form a pointer 4 used in connection with the scale S.

The movable gauge element 5 has projecting laterally therefrom in the same direction as the member 3, a pointer or finger 6 which cooperates with the pointer 4 to measure the cream contained in the test tube T between certain markings of the scale S.

The member 5 which is mounted to slide under the guides 2 of the bar 1 has a finger piece 7 formed by rolling the metal from which the device 5 is constructed, outwardly, as is shown clearly in Figs. 2 and 3 and which is designed to be readily grasped by the finger of the user to slide the member 5 back and forth in the guides 2 to obtain the proper position to indicate in connection with pointer 4, the amount of butter fat or cream indicated in the tube T between certain of the scale markings thereof.

In the use of this instrument the cream having risen in the tube T say to the point between 15 and 50, the pointer 4 is placed on the scale mark 15 and the finger 6 manipulated to bring it into register with the scale mark 50. The frictional contact of the member 5 in the guides 2 will hold the movable pointer in this position and the device is then positioned with the pointer 3 registering with zero on the scale and the mark at which the pointer 6 is located will indicate the quantity of butter fat or cream in the milk being tested.

While this instrument is shown and described as used in connection with the scale contained on the test tube T obviously it may be used in connection with any other scale located at any other point, the only difference being that the space between the pointers 4 and 6 will be used to show the thickness or height of the cream in the tester and when applied to the scale located at any other point will show just the amount contained in the tube.

This device as will be obvious, is very simple and cheap to manufacture and may be readily manipulated by one hand in the manner above set forth.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

A device of the class described comprising a strip of sheet metal having inturned side edges to provide guides, a fixed pointer extending laterally from one side edge thereof and a movable pointer also extending laterally in the same direction as the fixed pointer and including a plate mounted to slide in said guide, said plate having a rolled outturned finger grip for manipulating the pointer.

In testimony whereof, I affix my signature hereto.

W. C. HUNTER.